United States Patent
Suzuki et al.

(10) Patent No.: US 8,190,666 B2
(45) Date of Patent: May 29, 2012

(54) RANDOM NUMBER GENERATION DEVICE AND VEHICLE CONTROL DEVICE

(75) Inventors: Akira Suzuki, Utsunomiya (JP); Masayo Shiba, Utsunomiya (JP); Kohei Seino, Shimotsuke (JP)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 986 days.

(21) Appl. No.: 12/124,821

(22) Filed: May 21, 2008

(65) Prior Publication Data
US 2008/0294707 A1    Nov. 27, 2008

(30) Foreign Application Priority Data
May 25, 2007   (JP) ................ P2007-139199

(51) Int. Cl.
G06F 7/58    (2006.01)
(52) U.S. Cl. ........................................... 708/250
(58) Field of Classification Search .................. None
See application file for complete search history.

(56) References Cited

U.S. PATENT DOCUMENTS

| | | | |
|---|---|---|---|
| 4,944,008 A | | 7/1990 | Piosenka et al. |
| 5,600,723 A | * | 2/1997 | Woodall et al. ........... 713/170 |
| 5,940,007 A | | 8/1999 | Brinkmeyer et al. |
| 6,298,360 B1 | * | 10/2001 | Muller ........................ 708/250 |
| 6,658,328 B1 | * | 12/2003 | Alrabady et al. .............. 701/1 |
| 2005/0151619 A1 | | 7/2005 | Forest et al. |
| 2006/0087403 A1 | | 4/2006 | Yamamoto et al. |
| 2006/0197381 A1 | * | 9/2006 | Yoshimura et al. ........ 307/10.2 |
| 2006/0273924 A1 | * | 12/2006 | Schwartz ..................... 340/907 |
| 2007/0174611 A1 | | 7/2007 | Urban et al. |
| 2007/0174612 A1 | | 7/2007 | Urban et al. |
| 2007/0266067 A1 | * | 11/2007 | Matsui ......................... 708/250 |

FOREIGN PATENT DOCUMENTS

| | | |
|---|---|---|
| EP | 0 797 518 B1 | 3/2000 |
| EP | 0 993 999 A2 | 4/2000 |
| EP | 0 993 999 A3 | 3/2003 |
| EP | 1 688 888 A1 | 8/2006 |
| JP | 2002-268946 A | 9/2002 |
| JP | 3496547 B2 | 11/2003 |
| JP | 2006-024140 A | 1/2006 |

OTHER PUBLICATIONS

Notice of Allowance, Japanese Application No. 2007-139199 dated Jan. 4, 2012.

* cited by examiner

*Primary Examiner* — David H Malzahn
(74) *Attorney, Agent, or Firm* — Arent Fox LLP (57) ABSTRACT

A random number generation device including a first random number generation part which generates a new random number based on a random number which was previously generated and which outputs the random number generated by the first random number generation part, the random number generation device includes: a second random number generation part which generates a random number different from the random number generated by the first random number generation part; and an operation part which outputs a random number obtained by a prescribed operation using a random number generated by the second random number generation part on a random number generated by the first random number generation part when generating a first random number after start of supplying electric power.

8 Claims, 5 Drawing Sheets

FIG. 5

RANDOM NUMBER GENERATION DEVICE AND VEHICLE CONTROL DEVICE

TECHNICAL FIELD

The present invention relates to a random number generation device which generates new random numbers based on previously generated random numbers and a vehicle control device having the random number generation device.

Priority is claimed on Japanese Patent Application No. 2007-139199, filed May 25, 2007, the content of which is incorporated herein by reference.

BACKGROUND OF THE INVENTION

In recent years, a vehicle control device has been generalized to be a device which performs various controls with respect to a vehicle such as the start control of an engine, an opening-and-closing control of a lock, or the like, based on a verification result by comparing an ID code (i.e., an identification code) stored in a key (e.g., an ignition key) which is carried by a user with an ID code registered in the vehicle for a purpose of antitheft of the vehicle or improved convenience for the user. The vehicle control device has a random number generation device which generates random numbers for encoding the ID code in the key and the ID code in the vehicle in order to verify the ID codes while preventing the ID code stored in the key from leaking.

Japanese Patent (Granted) Publication No. 3496547 discloses an example of a random number generation device in which the last generated random number is temporarily stored in a backup RAM (i.e., Random Access Memory) and then a new random number is generated by utilizing the stored random number. In order to prevent deleting the past random numbers, the random number generation device stores the random number at a point when an operation frequency reaches a prescribed value in a nonvolatile memory such as an EEPROM (i.e., Electronically Erasable and Programmable Read Only Memory) or the like. If the backup memory is anomalous, the random number generation device generates a present random number based on the last random number stored in the nonvolatile memory.

There is a concern that security performance has deteriorated since systems of random number generation have become easy to analyze in a case in which electricity supplied from a battery stops (i.e., a battery cancellation is conducted) by detaching the battery or the like. For example, in Japanese Patent (Granted) Publication No. 3496547, a new random number is generated using a random number stored in a nonvolatile memory when there is a battery cancellation. However, if repeating the battery cancellations at intervals in which the random numbers stored in the nonvolatile memory are renewed, it is believed that the generation order of random numbers can be analyzed theoretically. Practically, it is extremely difficult to analyze the generation order of random numbers, and the probability of leakage of the ID codes is extremely slight. However, it is important to increase security performance.

In addition, the nonvolatile memory such as an EEPROM has a problem of being limited in rewritable frequency. In the above-mentioned Japanese Patent (Granted) Publication No. 3496547, rewriting of the nonvolatile memory is reduced by rewliting the nonvolatile memory only when operation frequencies reach a prescribed number. However, the numbers of years of vehicles after sale vary. Therefore, there is a possibility in that the nonvolatile memory is rewritten more frequently times than planned if the vehicle is used for long years. Assuming that failures occur in the backup memory in addition to a case in which the nonvolatile memory cannot be rewritten, it is possible to generate the same random numbers repeatedly, resulting in a deterioration of security performance. As described above, the conventional countermeasure is not enough to prevent deterioration of the security performance. Therefore, it is necessary to take enough countermeasures.

SUMMARY OF THE INVENTION

The prevent invention is achieved in view of the above circumstances, and has an object of providing a random number generation device having a main object of improving security performance and reducing the frequency of rewriting a nonvolatile memory, and a vehicle control device having the random number generation device.

In order to solve the above problems, a random number generation device of the present invention including a first random number generation part which generates a new random number based on a random number which was previously generated and which outputs the random number generated by the first random number generation part, the random number generation device includes: a second random number generation part which generates a random number different from the random number generated by the first random number generation part; and an operation part which outputs a random number obtained by a prescribed operation using a random number generated by the second random number generation part on a random number generated by the first random number generation part when generating a first random number after starting to supply electric power.

According to the present invention, in a case in which a first random number is generated after starting to supply electric power, a prescribed operation is performed to a random number which is generated by the first random number generation part using a random number which is generated by the second random number generation part. A random number is generated by the operation and outputted.

It is preferable that the above random number generation device further include a volatile memory in which a random number generated by the first random number generation part is stored only while the electric power is supplied, wherein the first random number generation portion generates a new random number based on the random number stored in the volatile memory and stores it in the volatile memory.

It is preferable that the above random number generation device further include a nonvolatile memory in which a random number generated by the second random number generation part is stored when the electric power is not supplied, wherein the second random number generation part generates a new random number based on a random number stored in the nonvolatile memory using a generation method of random numbers which is different from the first random number generation part.

In the above random number generation device, it is preferable that the second random number generation part generate a new random number only when generating a first random number after starting to supply electric power, and store the random number in the nonvolatile memory.

In the above random number generation device, it is preferable that the second random number generation part generate using a linear congruential method based on a random number stored in the nonvolatile memory.

In the above random number generation device, it is preferable that the random number generation device further have a third random number generation part which generates a random number corresponding to a period which is necessary to store a random number generated by the second random number generation part into the nonvolatile memory, wherein the operation part operates a prescribed operation using a random number generated by the third random number generation part in addition to a random number generated by the second random number generation part.

A vehicle control device of the present invention performs a prescribed control with respect to a vehicle based on a verify result of an identification code stored in a key carried by a user with an identification code previously registered in the vehicle, the vehicle control device has the above random number generation device, in which electric power is supplied from a battery provided at the vehicle, wherein the vehicle control device encodes the identification code of the key and the identification code of the vehicle using a random number generated by the random number generation device.

In the above vehicle control device, it is preferable that: the prescribed control with respect to the vehicle is a start control of an engine; and the random number generation device generates a first random number in a case in which there is a first start instruction of the engine after starting to supply electric power from the battery.

According to the present invention, in a case in which a first random number is generated after starting to supply electric power, a random number obtained by a prescribed operation which is performed on a random number which is generated by a first random number generation part, using a random number which is generated by a second random number generation part, is outputted. Therefore, for example, the same random number is prevented from being generated when the electric power supply starts. As a result, security performance can be improved.

Furthermore, since a random number is written in a nonvolatile memory only when generating a first random number after starting to supply electric power, the writing frequency of the nonvolatile memory can be extremely reduced.

DETAILED DESCRIPTION OF THE INVENTION

A random number generation device and a vehicle control device according to embodiments of the present invention are described below in detail referring to the drawings.
[First Embodiment]

Figure 1:
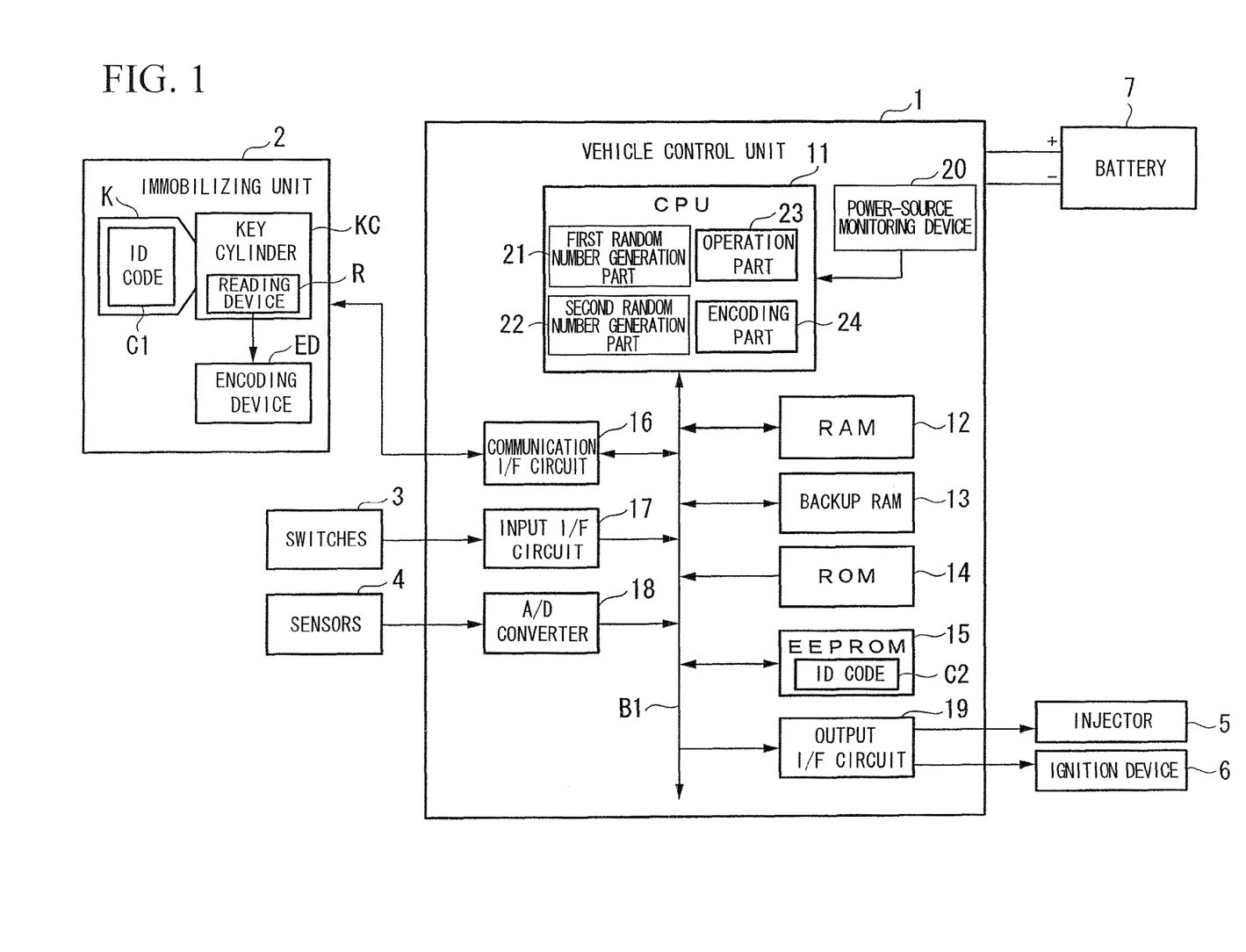
FIG. 1 is a block diagram showing an essential structure of a random number generation device and a vehicle control device according to a first embodiment of the present invention.

FIG. 1 shows a block diagram showing a principal structure of a random number generation device and a vehicle control device of a first embodiment according to the present invention. In FIG. 1, in addition to a vehicle control unit 1 as the vehicle control device of the first embodiment according to the present invention, an immobilizing unit 2, switches 3, sensors 4, an injector 5, an ignition device 6, and a battery 7, which are blocks mounted on a vehicle, are illustrated. First, those blocks illustrated in FIG. 1 are summarized.

The vehicle control unit 1 performs various controls such as a start control of an engine (not shown) or the like, based on a verify result of an ID code (i.e., identification code) C1 stored in an ignition key K which is carried by a user and an ID code C2 stored previously registered in the vehicle. In the present embodiment, the ID code C2 is stored in an EEPROM 15 which is provided at the vehicle control unit 1. The immobilizing unit 2 includes a key cylinder KC having a reading device R which reads the ID code C1 of the ignition key K, and an encoding device ED which encodes the ID code C1 which is read in the reading device R. The immobilizing unit 2 reads the ID code C1 registered in the ignition key K, encodes it using a random number transmitted from the vehicle control unit 1, and transmits the encoded ID code (hereinafter, a security cancelling code C11) to the vehicle control unit 1.

The switches 3 include various switches with respect to an engine controlling, for example, a brake switch, a side stand switch, and the like. The sensors 4 includes various sensors with respect to an engine controlling, for example, a water-temperature sensor, an intake-pipe pressure sensor, a brake sensor, an atmospheric pressure sensor, and the like. The injector 5 and the ignition device 6 are provided at the engine of the vehicle, and perform a fuel injection and an ignition while being controlled by the vehicle control unit 1. The battery 7 supplies direct-current power to the vehicle control unit 1 and the immobilizing unit 2 shown in FIG. 1, and also supplies direct-current power to a starter (not shown) or the like.

The vehicle control unit 1 is described in detail. As shown in FIG. 1, the vehicle control unit 1 includes a CPU (i.e., a central processing unit) 11, a RAM 12, a backup RAM 13 (i.e., a volatile memory), a ROM 14, an EEPROM 15 (i.e., a nonvolatile memory), a communication interface (i.e., I/F) circuit 16, an input I/F circuit 17, an A/D converter 18, an output I/F circuit 19, and a power-source monitoring circuit 20, which are connected with each other via a bus BI. The random number generation device of the first embodiment according to the present invention is composed from the CPU 11, the backup RAM 13, the EEPROM 15, and the bus BI.

The CPU 11 performs various control programs stored in the ROM 14 so as to control all actions of the vehicle control unit 1. Specifically, in accordance with states of the switches 3 and detection results of the sensors 4, the fuel injection by the injector 5 and the ignition by the ignition device 6 are controlled. The CPU 11 generates a random number for encoding the ID code C1 registered in the ignition key K and the ID code C2 previously registered in the vehicle. Furthermore, the CPU 11 verifies the encoded ID code C1 (i.e., the security cancelling code C11) transmitted from the immobilizing unit 2 with the encoded ID code C2 (hereinafter, a verifying code C12). Based on the verify result, the CPU 11 controls a start of the engine by controlling the fuel injection of the injector 5 and the ignition of the ignition device 6.

As shown in FIG. 1, the CPU II executes a control program stored in the ROM 14, so that the CPU 11 is practicable as a first random number generation part 21, a second random number generation part 22, an operation part 23, and an encoding part 24. The first random number generation part 21 generates a new random number based on the past random number stored in the backup RAM 13. For example, the first random number generation part 21 executes a timer (i.e., a free running timer) having a low level of priority which counts a prescribed time (e.g., 10 msec), adds the obtained time (i.e., a random number value) to a past random number stored in the backup RAM 13 so as to generate a new random number. The free running timer has a low level of priority, so that activation timing thereof disperses depending on the other processing timing having a high degree of priority. The first random number generation part 21 generates a random number utilizing the dispersion of the start timing of the free running timer.

The second random number generation part 22 generates a new random number different from the random number generated by the first random number generation part 21, based on the past random number stored in the EEPROM 15. For example, the second random number generation part 22 generates a new random number using a linear congruential method. The linear congruential method is a method of generating a random number which is denoted by the below formula (1).

$$X_n = (A \cdot X_{n-1} + B) \bmod M \tag{1}$$

In the formula (1), $X_{n-1}$ in the right side of the equation is the last random number (which is generated in the past); $X_n$ in the left of the equation is a new random number which is generated at this time. A, B, and M in the right side denotes elective constant numbers satisfying relations of 0<A<M and 0<B<M. The variable "n" is a positive integer. It is recognized from the formula (1) that a new random number $X_n$ can be obtained by executing a residue operation (i.e., mod) of the constant M with respect to a value obtained by adding the constant B to a value obtained by multiplying the last random number $X_{n-1}$ by the constant A.

The operation part 23 performs a prescribed operation using a random number generated by the second random number generation part 22 on a random number generated by the first random number generation part 21, in a case in which the first random number is generated after starting to supply the electric power from the battery 7. The operation part 23 can perform an addition, a subtraction, a multiplication, a division, an operation using a subscribed polynomial expression, an operation using a higher order function, and the other elective operation. The operation part 23 performs the above operations in order to improve security performance.

There is a concern that the same random number is generated immediately after starting to supply the electric power from the battery 7. Alternately, it has become easy to analyze a generation order of random numbers. Therefore, the security performance is improved by generating two random numbers and executing a prescribed operation thereto so that the analysis of the random numbers by an outsider is difficult. Hereinafter, in order to simplify the explanations, the operation part 23 is described by an example of executing an operation of adding a random number generated by the first random number generation part 21 and a random number generated by the second random number generation part 22.

The encoding part 24 encodes the ID code C2 stored in the EEPROM 15 using a random number generated by the first random number generation part 21 or a random number outputted from the operation part 23 by the same encoding algorithm as that used by the encoding device ED. The CPU 11 verifies the security cancel code C11 transmitted from the immobilizing unit 2 and the verifying code C12 outputted from the encoding part 24; when the codes are agreed, the CPU 11 controls the start of the engine by controlling the injection of the injector 5 and the ignition of the ignition device 6.

The RAM 12 is a volatile memory which can maintain memories only during the battery 7 supplies electric power, and temporarily stores various operation results of the CPU 11 and various control information for controlling the vehicle. The electric power is supplied from the battery 7 to the RAM 12 during the ignition key K is inserted in the key cylinder KC so that a key switch (not shown) is "ON"; it stops while the key switch is "OFF".

The backup RAM 13 stores a random number generated by the first random number generation part 21. The backup RAM 13 is also a volatile memory as the RAM 12; however, electric power is continually supplied from the battery 7. That is, either the key switch is "ON" or "OFF", the backup RAM 13 maintains memories with being supplied the electric power from the battery 7. However, the memories stored in the backup RAM 13 are deleted when the electric power supply is stopped by executing the battery cancellation.

The ROM 14 stores various control programs which are performed by the CPU 11. The EEPROM 15 stores the ID code C2 previously registered in the vehicle and a random number generated by the second random number generation part 22. The EEPROM 15 is a nonvolatile memory which can maintain the memories, and can partially delete and rewrite the memories. That is, without deleting the ID code C2 stored in a part of the storage area of the EEPROM 15, it is possible to write, delete, and rewrite a random number generated by the second random number generation part 22 with respect to the other part of the storage area.

The communication I/F circuit 16 communicates with the immobilizing unit 2, outputs a random number request signal from the immobilizing unit 2 to the CPU 11, and transmits a random number generated by the first random number generation part 21 or a random number outputted from the operation part 23. In addition, the communication I/F circuit 16 also outputs the security cancel code C11 from the immobilizing unit 2 to the CPU 11.

The input I/F circuit 17 outputs signals which indicate "ON" or "OFF" of various switch of the switches 3 to the CPU 11. A/D converter 18 converts signals which indicate detection results of various sensors of the sensors 4 to digital signals and outputs them to the CPU 11.

The output I/F circuit 19 outputs the control signals of the fuel injection and the ignition from the CPU 11 to the injector 5 and the ignition device 6, respectively. The power-source monitoring circuit 20 monitors the variation of power voltage supplied from the battery 7, and outputs signals indicating the monitor result to the CPU 11. For example, when the electric power is supplied again after the battery cancellation, the power-source monitoring circuit 20 outputs reset signals to the CPU 11 until a user instructs to start the engine. Abnormal operation of the CPU 11 can be prevented when resuming the electric power supply since the CPU 11 is initialized by the reset signals. The reset signals are cancelled immediately after the first instruction by the user to start the engine after the battery cancellation. Therefore, the CPU 11 can be informed that there is a first instruction to start the engine after the battery cancellation, whether the reset signals have been inputted or not at the time of the engine is instructed to start.

Figure 2:
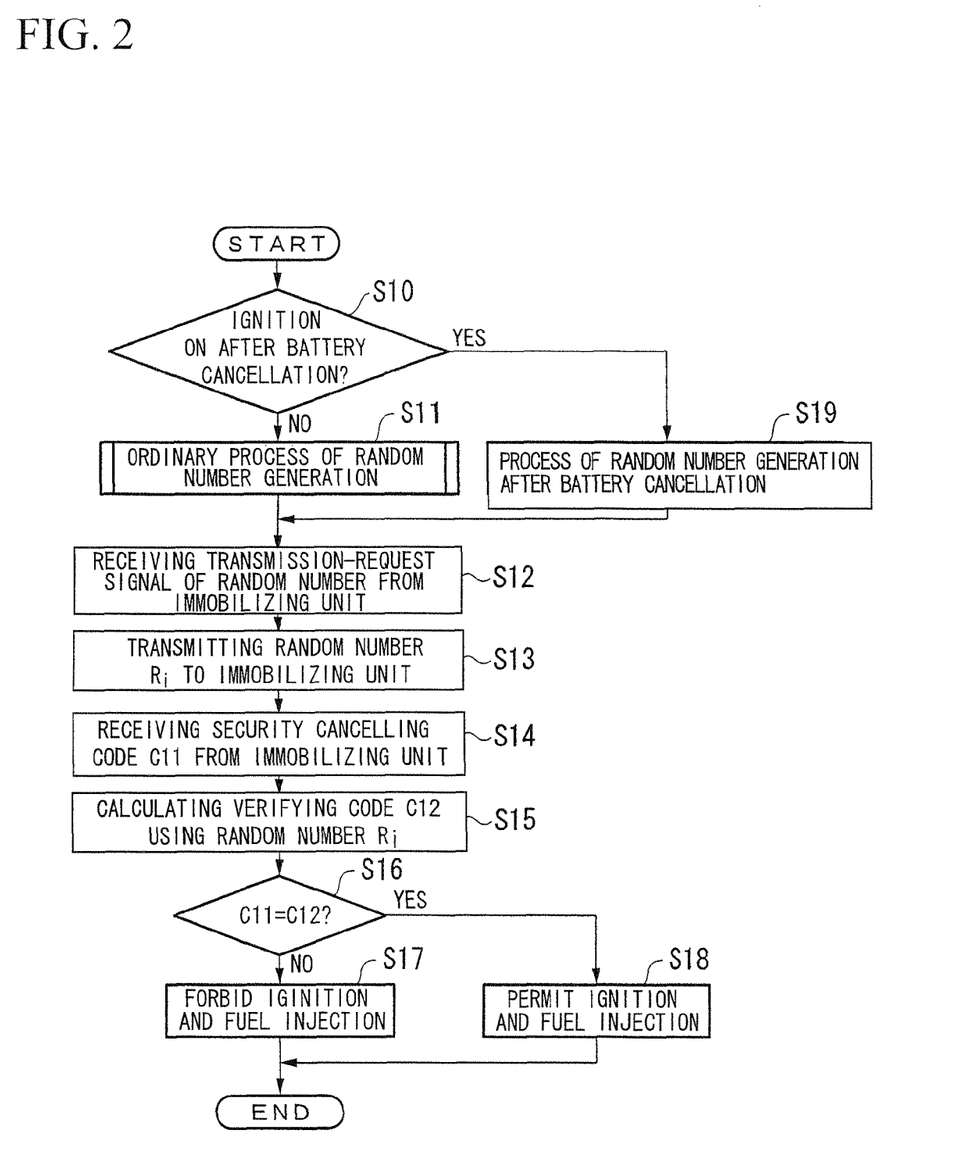
FIG. 2 is a flow chart showing a process of the vehicle control device according to the first embodiment of the present invention.
Figure 3A:
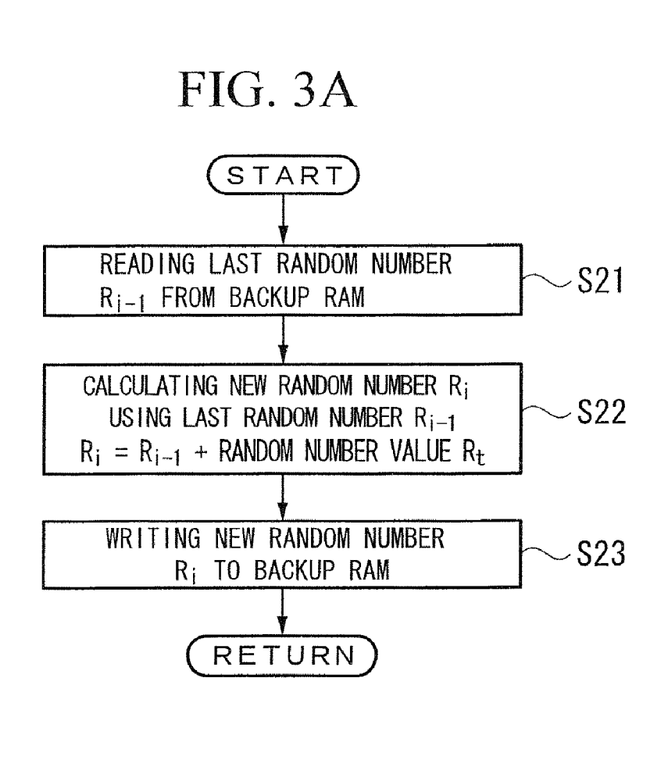
FIGS. 3A and 3B are flow charts showing processes of the random number generation device according to the first embodiment of the present invention.
Figure 3B:
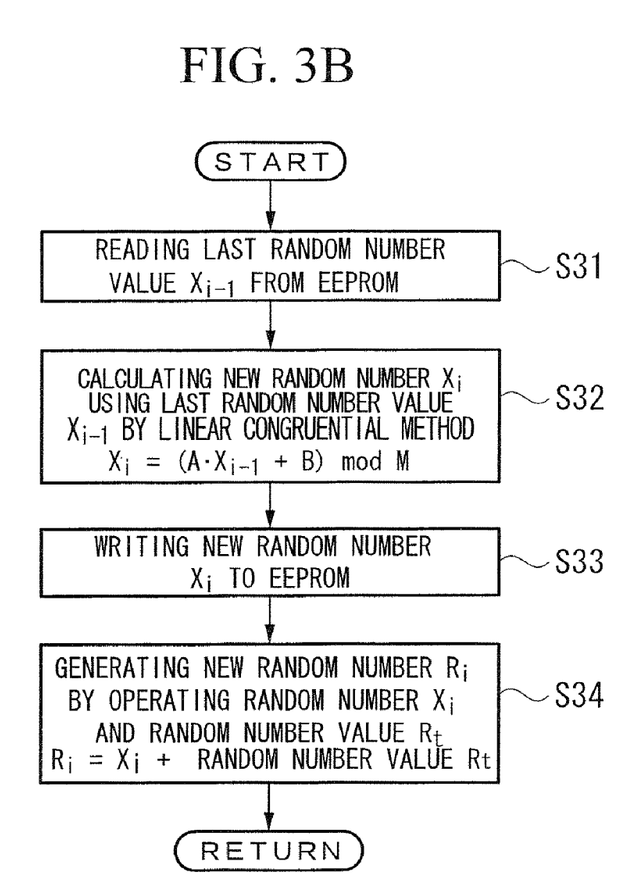

Next, processes performed by the random number generation device and the vehicle control device according to the first embodiment of the present invention are described. FIG. 2 is a flow chart showing the processes of the vehicle control device according to the first embodiment of the present invention. FIGS. 3A and 3B are flow charts showing the processes of the random number generation device according to the first embodiment of the present invention. Hereafter, an ordinary operation when the battery cancellation is not performed and an operation when the battery cancellation is performed separately is described. A process shown in FIG. 2 starts when the ignition switch (not shown) becomes "ON" (hereinafter, "ignition on"), that is, when the user inserts the ignition key K into the key cylinder KC and turns the ignition key K so as to instruct the start of the engine.

[Ordinary Operation]

When the ignition switch is "ON", a signal thereof is transmitted from the immobilizing unit 2 to the vehicle control unit 1. The CPU 11 of the vehicle control unit 1 receives the signal, and then decides whether it is the "ignition on" after the battery cancellation (Step S1). Ordinarily when the battery cancellation is not performed, the power-source monitoring circuit 20 does not output the reset signal. Therefore, the decision in Step S10 is "NO", so that an ordinary process of generating a random number is performed (Step S11).

In the ordinary process of generating a random number, as shown in FIG. 3A, the first random number generation part 21 first reads the last random number $R_{i-1}$ stored in the backup RAM 13 (Step S21). The variable "i" is a positive integer. Next, the first random number generating part 21 operates a new random number $R_i$ using the last random number $R_{i-1}$. Specifically, a free running timer having a low level of priority which counts a prescribed time (e.g., 10 msec) is executed so as to obtain a random number value $R_t$; and then, a new random number $R_i$ is obtained by adding the random number value $R_t$ to the last random number $R_{i-1}$ (Step S22). Furthermore, the new random number Ri obtained by Step S22 is written to the backup RAM 13 (Step S23). Consequently, the ordinary process of generating a random number concludes.

The CPU 11 receives a transmission-request signal of random numbers from the immobilizing unit 2 when the ordinary process of generating a random number concluded (Step S12). The transmission-request signal is transmitted from the immobilizing unit 2 to the vehicle control unit 1 at regular intervals during a prescribed time (e.g., a few seconds) elapses after the "ignition on". The CPU 11 transmits the new random number $R_i$ obtained in Step S11 to the immobilizing unit 2 in response to receive the transmission request signal of random numbers from the immobilizing unit 2.

When receiving the random number $R_i$ from the vehicle control unit 1, the immobilizing unit 2 transfers the random number $R_i$ to the encoding device ED, and encodes the ID code C1 read by the reading device R using the random number $R_i$. Thereby, generating the security cancelling code C11. The security cancelling code C11 is transmitted to the vehicle control unit 1 from the immobilizing unit 2 and received at the CPU 11 (Step S14). The ID code C1 can be prevented from an illegal use by outsiders since security cancelling code C11 is encoded by using the random number $R_i$.

When the security cancelling code C11 is received, the encoding part 24 of the CPU 11 reads the ID code C2 from the EEPROM 15, and then encodes the ID code C2 by using the random number $R_i$ obtained at Step S11. As a result, the verifying code C12 is generated (Step S15). When the above processes end, the CPU 11 verifies the security cancelling code C11 received at Step S14 and the verifying code C12 generated in Step S15, and then decides whether those codes correspond with each other or not (Step S16).

In accordance with the verification, if the security cancelling code C11 and the verifying code C12 are determined to not correspond with each other (i.e., the decision result is "NO"), then the CPU 11 forbids both ignition and fuel injection. That is, the CPU 11 does not output control signals to the injector 5 and the ignition device 6 (Step S17). On the other hand, if the security cancelling code C11 and the verifying code C12 are determined to correspond with each other (i.e., the decision result is "YES"), then the CPU 11 permit both ignition and fuel injection. That is, the CPU 11 outputs control signals to the injector 5 and the ignition device 6 respectively, so that the engine starts (Step S18). The engine is controlled in this manner.

[Operation After the Battery Cancelling]

When the electric power from the battery 7 is supplied again after the battery cancelling, the power-source monitoring circuit 20 continually outputs reset signals to the CPU 11. In this state, if the ignition switch is "ON", the signal indicating it is transmitted to the vehicle control unit 1 from the immobilizing unit 2. The CPU 11 of the vehicle control unit 1 receives the signal, and then decides whether the "ignition on" is performed after the battery cancelling or not (Step S10).

At the time when the ignition switch is "ON", since the reset signals are outputted from the power-source monitoring circuit 20, the CPU 11 decides that the "ignition on" is performed after the battery cancelling so that the decision result in Step S10 is "YES". Accordingly, the process of generating a random number after the battery cancelling is performed (Step S19). In the process in Step S19, the first random number is generated after the electric power is again supplied from the battery 7. The reset signal from the power-source monitoring circuit 20 is cancelled immediately after the ignition switch is "ON".

In the process of generating a random number after the battery cancelling, as shown in FIG. 3B, the second random number generation part 22 reads the last value $X_{i-1}$ stored in the EEPROM 15 (Step S31). The variable "i" is a positive integer. Next, the second random number generation part 22 operates a new random number $X_i$ by a linear congruential method using the last value $X_{i-1}$. Specifically, by using the formula (1), the new random number $X_i$ is calculated by executing a residues operation (i.e., mod) of the constant M with respect to a value obtained by adding the constant B to a value obtained by multiplying the last random number $X_{i-1}$ by the constant A. As described above, the second random number generation part 22 generates a new random number only in a case in which the "ignition on" is performed after the battery cancellation, and then writes the random number to the EEPROM 15.

In parallel with the above processes, the first random number generation part 21 executes the free running timer having a low level of priority which counts a prescribed time (e.g., 10 msec) so that a random number $R_t$ is obtained. The operation part 23 then operates the new random number $X_i$ obtained by the second random number generation part 22 in Step S32 and the random number $R_t$ obtained by the first random number generation part 21 so as to generate a new random number $R_i$ (Step S34). The process of generating a random number after the battery cancellation is concludes by performing the above processes.

When the processes of generating a random number after the battery cancelling concludes, the CPU 11 receives a transmission-request signal from the immobilizing unit 2 (Step S12), and then transmits the new random number $R_i$ obtained in Step S12 to the immobilizing unit 2 in response to the transmission-request signal (Step S13). In the immobilizing unit 2, the ID code C1 which is read from the ignition key K is encoded into the security cancelling code C11 by using the new random number $R_i$. The security cancelling code C11 is transmitted to the vehicle control unit 1 and received by the CPU 11 (Step S14).

Next, the encoding part 24 of the CPU 11 reads the ID code C2 from the EEPROM 15, and then encodes the ID code C2 by using the random number $R_i$ obtained in Step S19. Thereby, generating the verifying code C12 (Step S15). Furthermore, the security cancelling code C12 received in Step S14 and the verifying code C12 generated at Step S15 are verified (Step S16). If those codes do not correspond with each other, then ignition and fuel injection are forbidden (Step S17). Alternately, if those codes correspond with each other, ignition and fuel injection are permitted. The engine is controlled to start in such a manner.

As described above, in the random number generation device according to the first embodiment of the present invention, when the first random number is generated after the electric power from the battery 7 is supplied again after the battery cancellation, the random number value $R_t$ is obtained by the first random number generation part 21 and the new random number $X_i$ is generated by the second random number generation part 22, and the operation part 23 performs the subscribed operation (i.e., addition) using the random number $X_i$ with respect to the random number value $R_t$. Therefore, security performance can be improved. In addition, the EEPROM 15 is written only when the "ignition on" is performed after the battery cancellation. Accordingly, the frequency of rewriting the EEPROM 15 can be excellently reduced. The vehicle control device according to the first embodiment of the present invention can improve an antitheft effect of a vehicle by providing the above-mentioned random number generation device.

[Second Embodiment]

Figure 4:
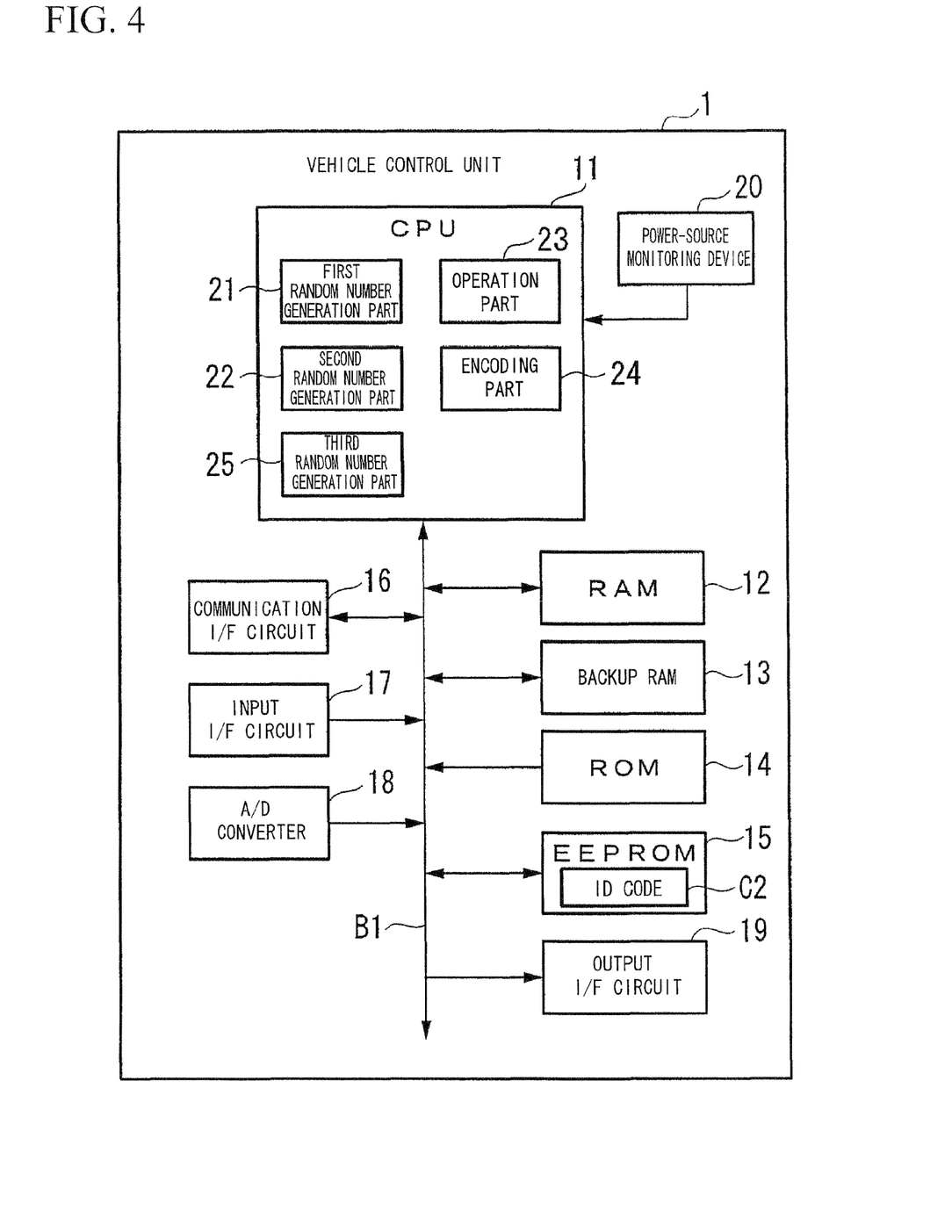
FIG. 4 is a block diagram showing an essential structure of a random number generation device and a vehicle control device according to a second embodiment of the present invention.

FIG. 4 is a block diagram showing an essential structure of a random number generation device and a vehicle control device according to a second embodiment of the present invention. The immobilizing unit 2, the switches 3, the sensors 5, the injector 5, the ignition device 6, and the battery 7 shown in FIG. 1 are omitted to be illustrated in FIG. 4. In the first embodiment, the CPU 11 executes the control program stored in the ROM 14, so that the CPU 11 functions as the first random number generation part 21, the second random number generation part 22, the operation part 23, and the encoding part 24. In addition, the CPU 11 functions also as a third random number generation part 25 in the second embodiment.

The third random number generation part 25 generates a random number in accordance with the time spent for writing a random number generated by the second random number generation part 22 into the EEPROM 15. Specifically, the third random number generation part 25 starts a free running timer having a low level of priority similar to the free running timer started by the first random number generation part 21. The third random number generation part 25 calculates the difference between a time T1 when the second random number generation part starts writing to the EEPROM 15 and a time T1 when the writing operation in the EEPROM 15 ends. The third random number generation part 25 sets the difference as a random number. The time necessary to write the EEPROM 15 is varied in accordance with a variation of property of the EEPROM 15 and an ambient temperature, and is convenient to be used as a random number.

Figure 5:
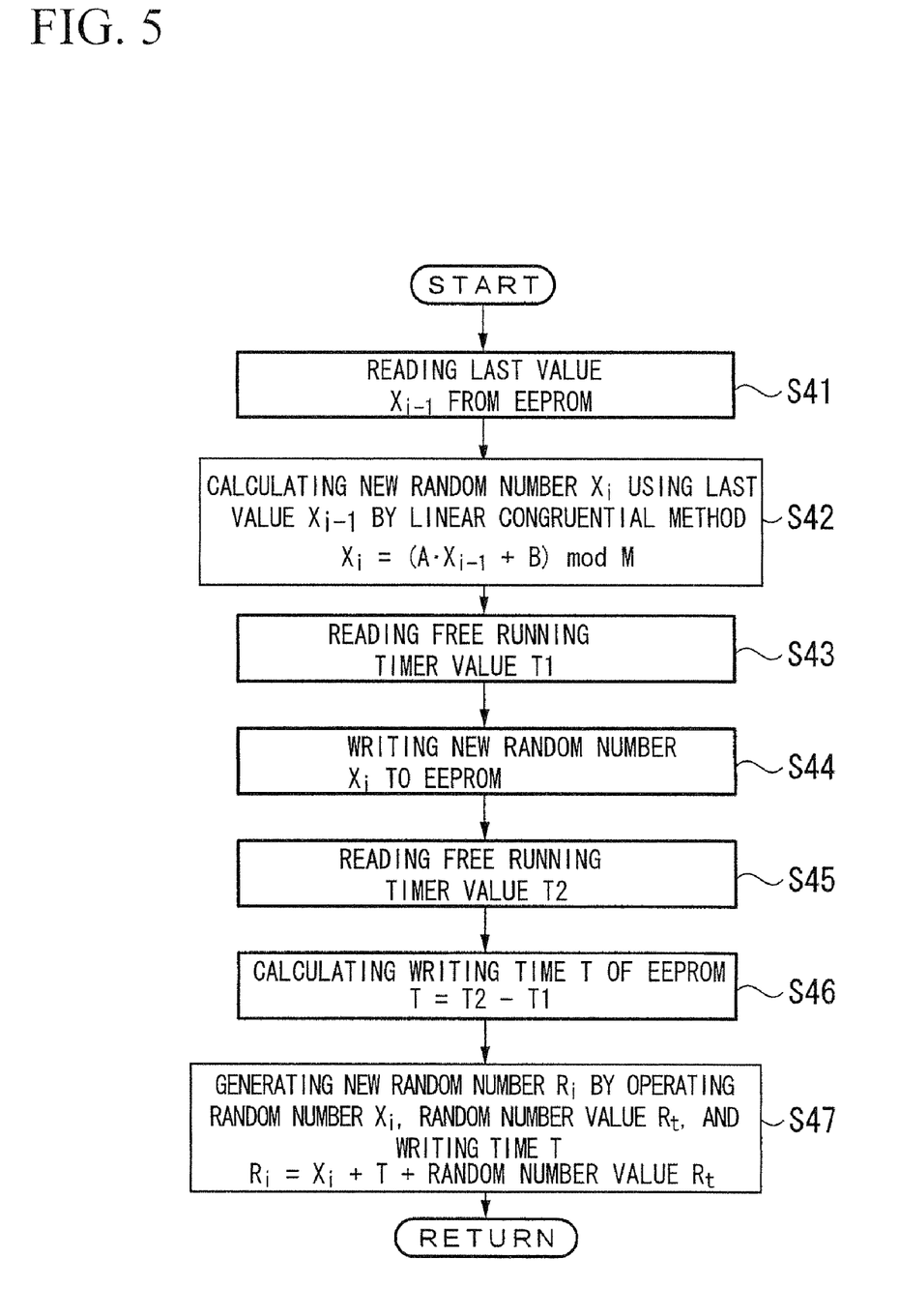
FIG. 5 is a flow chart showing a process after a battery cancellation of the random number generation device according to the second embodiment of the present invention.

Next, a process which is performed by the random number generation device and the vehicle control device according to the second embodiment of the present invention will be explained. The process of the present embodiment is basically performed along the flow chart shown in FIG. 2. However, there is a difference from the process after the battery cancellation (Step S19) of the first embodiment. Hereafter, the process after the battery cancellation is focused on and will be explained. FIG. 5 is a flow chart showing the process of the random number generation device according to the second embodiment of the present invention after the battery cancellation.

As shown in FIG. 5, when a random generation process starts after battery cancellation, the second random number generation part 22 reads a last value $X_{i-1}$, stored in the EEPROM 15 (Step S41); and then calculates a new random number $X_i$ by the linear congruential method using the last value $X_{i-1}$ (Step S42). Next, if there is a writing instruction of the new random number $X_i$ by the second random number generation part 22 to the EEPROM 15, the third random number generation part 25 reads a value T1 of the free running timer (Step S43). Next, in accordance with the writing instruction, the new random number $X_i$ obtained by Step S42 is written into the EEPROM 15 (Step S44).

When the writing process ends, the third random number generation part 25 reads a value T2 of the free running timer (Step S45), and calculates a writing time T of the EEPROM 15. That is, by subtracting the value T1 which is read by Step S43 from the value T2 which is read by Step S45, the writing time T is obtained. In parallel with the above processes, the first random number generation part 21 executes the free running timer having a low level of priority which counts a prescribed time (e.g., 10 msec) and obtains the random number $R_t$.

When the above processes ends, the operation part 23 operates: the new random number $X_i$ obtained by Step S32 by the second random number generation part 22; the random number value $R_t$ obtained by the first random number generation part 21; and the writing time T of the EEPROM 15 obtained by Step S46, so that a new random number $R_i$ is generated. Specifically, the random number $X_i$, the random number value $R_t$, and the writing time T are added together, and the new random number $R_i$ is generated (Step S47). The random number generation process after the battery cancellation ends by the above processes.

As described above, the random number generation device according to the second embodiment of the present invention, in a case in which a first random number is generated when the electric power supply from the battery 7 starts after the battery cancellation, the first random number generation part 21 obtains the random number value $R_t$; the second random number generation part 22 generates the new random number $X_i$; the writing time T of the random number $X_i$ into the EEPROM 15 is obtained; and the operation part 23 conducts a subscribed operation (i.e., addition) with respect to the random number value $R_t$ using the random number $X_i$ and the writing time T. Therefore, security performance can be more improved than the first embodiment. In addition, the same as in the first embodiment, the writing to the EEPROM 15 is conducted only when the "ignition on" is performed after the battery cancellation. Therefore, the rewriting frequency of the EEPROM 15 can be extremely reduced. The vehicle control device according to the second embodiment of the present invention has the above random number generation device, thereby further improving the antitheft effect of a vehicle.

While the random number generation device and the vehicle control device according to the embodiments of the present invention have been described and illustrated above, it is not limited to the above embodiments. Modifications can be made without departing from the spirit or scope of the present invention. For example, the first random number generation part 21 of the above embodiments generates a new random number from a past random number stored in the backup RAM 13 and a random number value obtained by using a free running timer having a low level of priority. However, the first random number generation part 21 can generate a random number (pseudo-random number) by various congruential methods (e.g., a linear congruential method, a mixed congruential method, a cumulative congruential method, an additive congruential method), a middle-square method, and the like.

In addition, the second random number generation part 22 of the above embodiments generates a new random number from a past random number stored in the EEPROM 15. However, the second random number generation part 22 can generate a random number from a timing result of the free running timer of the first random number generation part 21 without using the past random number of the EEPROM 15. Furthermore, it has been described as an example that the second random number generation part 22 generates a random number using a linear congruential method. However, the other congruential method (e.g., a mixed congruential method, a cumulative congruential method, and an additive congruential method), a middle-square method, or the like can be used as a random number generation method.

In addition, it is possible for the random number generation method used by the second random number generation part 22 to be the same as the random number generation method used by the first random number generation part 21 if only a random number which is generated by the second random number generation part 22 is different from a random number which is generated by the first random number generation part 21. For example, both the first random number generation part 21 and the second random number generation part 22 can use the linear congruential method. In a case in which the linear congruential method are used at both the first random number generation part 21 and the second random number generation part 22, the constants A, B, and M of the formula (1) should differ between the first random number generation part 21 and the second random number generation part 22. Thereby, differing the random number generated by the first random number generation part 21 and the random number generated by the second random number generation part 22.

Furthermore, in the above embodiments, it is described as an example that a case in which the vehicle control unit 1 controls the start of an engine. However, the vehicle control unit of the present invention can be applied to a case in which the vehicle control unit conducts various controls with respect to a vehicle such as an opening-closing control of a key other than the start control of an engine. In addition, in the above embodiments, it is described as an example that the ID code C1 is read from the ignition key K which is inserted into the key cylinder KC. However, the present invention can be applied to a case in which an ID code which is registered in a key is transmitted by a radio wave. In this case, it is preferable that: a communication device which communicates with the key by a radio wave is provided in the immobilizing unit; a random number transmitted from the vehicle control unit 1 to the immobilizing unit 2 is transmitted to the key by the radio wave; and the immobilizing unit receives a security canceling code which is generated by the key and transmitted by the radio wave in response, and transmits it to the vehicle control unit 1.

Furthermore, in the above embodiments, it is described as an example that the CPU 11 conduct the control program stored in the ROM 14, so that the CPU 11 functions as the first random number generation part 21, the second random number generation part 22, the operation part 23, the encoding part 24, and the third random number generation part 25. However, those functions can be structured by an electronic circuit as hardware.

What is claimed is:

1. A random number generation device including a first random number generator which generates a new first random number based on a first random number which was previously generated and which outputs the new first random number generated by the first random number generator, the random number generation device comprising:

a second random number generator which generates a second random number different from the new first random number generated by the first random number generator; and an operation module which outputs a main random number obtained by a prescribed operation using the second random number generated by the second random number generator with the new first random number generated by the first random number generator only when generating a main random number after restarting of a supply of electric power to the device.

2. The random number generation device according to claim 1, further comprising:

a volatile memory in which a previously generated first random number generated by the first random number generator is stored only while the electric power is supplied, wherein the first random number generator generates the new first random number based on the first random number stored in the volatile memory and stores the new first random number in the volatile memory.

3. The random number generation device according to claim 2, further comprising:

a nonvolatile memory in which a previously generated second random number generated by the second random number generator is stored when the electric power is not supplied, wherein the second random number generator generates a new second random number based on a the second random number stored in the nonvolatile memory using a generation method of random numbers which is different from the first random number generator.

4. The random number generation device according to claim 1, wherein the second random number generator generates a new second random number only when generating a random number after the restarting of supplying electric power, and stores the new second random number in the nonvolatile memory.

5. The random number generation device according to claim 4, wherein the second random number generator generates the new second random number using a linear congruential method based on the second random number stored in the nonvolatile memory.

6. The random number generation device according to claim 4, further comprising:

a third random number generator which generates a third random number corresponding to a period which is necessary to store a the new second random number generated by the second random number generator into the nonvolatile memory, wherein the operation module operates the prescribed operation using the third random number generated by the third random number generator in addition to the new second random number generated by the second random number generator.

7. A vehicle control device performing a prescribed control with respect to a vehicle based on a verify result of an identification code stored in a key carried by a user with an identification code previously registered in the vehicle, comprising:

the random number generation device according to claim 1, in which electric power is supplied from a battery provided at the vehicle, wherein the vehicle control device encodes the identification code of the key and the identification code of the vehicle using a random number generated by the random number generation device.

8. The vehicle control device according to claim 7, wherein the prescribed control with respect to the vehicle is a start control of an engine, and the random number generation device generates a first main random number in a case in which there is a first start instruction of the engine after restarting of the supply of electric power from the battery to the device.

* * * * *